US 6,732,919 B2

(12) United States Patent
Macklin et al.

(10) Patent No.: US 6,732,919 B2
(45) Date of Patent: May 11, 2004

(54) SYSTEM AND METHOD FOR USING A MULTIPLE-USE CREDIT CARD

(75) Inventors: Lee Macklin, Colorado Springs, CO (US); Maria Pinsky, Colorado Springs, CO (US); Jessica Kraemer, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/078,629

(22) Filed: Feb. 19, 2002

(65) Prior Publication Data

US 2003/0155416 A1 Aug. 21, 2003

(51) Int. Cl.[7] .............................. G06K 5/00; G06F 17/00
(52) U.S. Cl. ....................................... 235/380; 235/375
(58) Field of Search .............................. 235/375, 379, 235/330

(56) References Cited

U.S. PATENT DOCUMENTS

| | | | | |
|---|---|---|---|---|
| 4,700,055 A | * | 10/1987 | Kashkashian, Jr. | 235/379 |
| 4,837,422 A | * | 6/1989 | Dethloff et al. | 235/380 |
| 5,530,232 A | * | 6/1996 | Taylor | 235/380 |
| 5,578,808 A | * | 11/1996 | Taylor | 235/380 |
| 5,770,843 A | * | 6/1998 | Rose et al. | 235/380 |
| 5,844,230 A | * | 12/1998 | Lalonde | 235/487 |
| 5,859,419 A | * | 1/1999 | Wynn | 235/487 |
| 5,917,168 A | | 6/1999 | Nakamura et al. | 235/379 |
| 5,974,146 A | | 10/1999 | Randle et al. | 380/24 |
| 6,000,608 A | | 12/1999 | Dorf | 235/380 |
| 6,149,055 A | * | 11/2000 | Gatto | 235/379 |
| 6,464,135 B1 | * | 10/2002 | Cohen et al. | 235/379 |
| 6,494,367 B1 | * | 12/2002 | Zacharias | 235/382 |
| 2003/0061157 A1 | * | 3/2003 | Hirka et al. | 705/39 |

* cited by examiner

Primary Examiner—Thien M. Le
Assistant Examiner—April Nowlin

(57) ABSTRACT

The present invention includes a system and method for facilitating financial transactions including a device configured to interface with a multi-use card, using information from a multi-use card to access a database that includes account information for accounts at multiple financial institutions, presenting the associated account information to a user, accepting a selection from the user of a selected account and posting the charges onto the selected account.

20 Claims, 3 Drawing Sheets

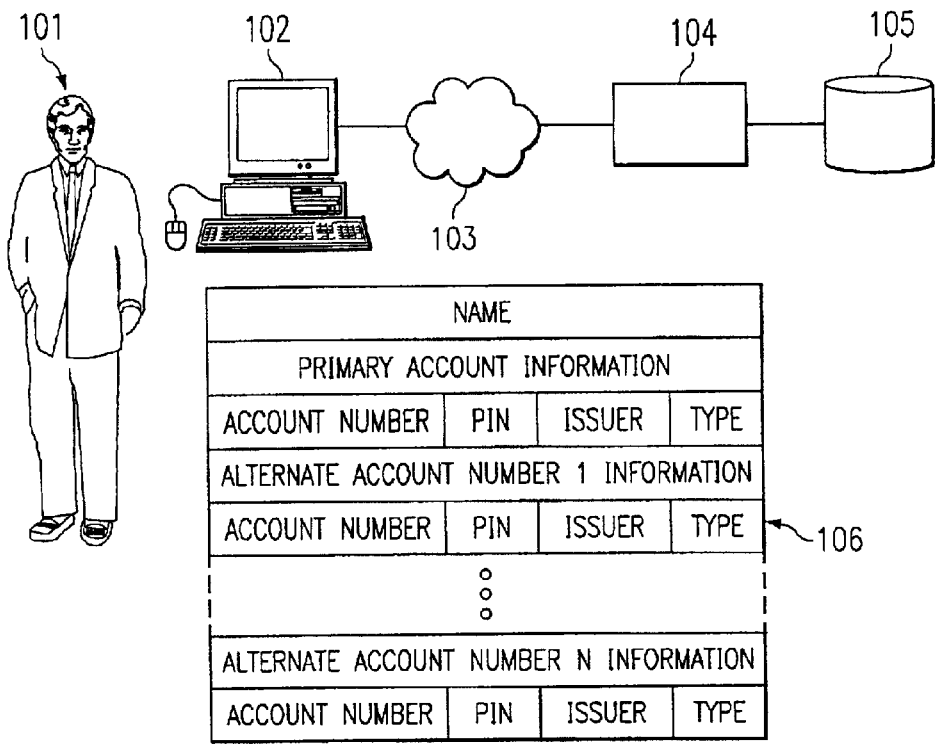
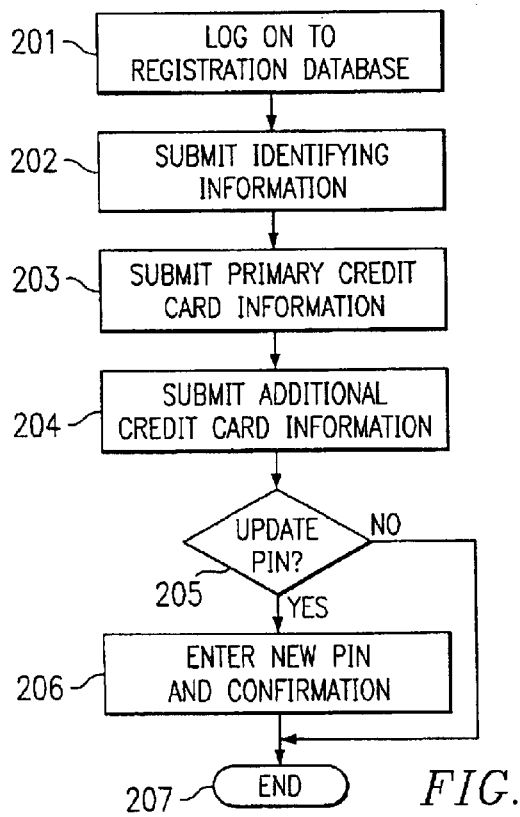
FIG. 1
FIG. 2

SYSTEM AND METHOD FOR USING A MULTIPLE-USE CREDIT CARD

TECHNICAL FIELD

The present invention relates to credit cards and more specifically to the aggregation of multiple credit card accounts on a single multiple-use credit card for use by the consumer.

BACKGROUND

As credit cards become more available, they are increasingly displacing currency and checks to make everyday purchases. Presently, many people receive and use numerous credit cards. Approvals are easily obtained, and can even be provided instantly over the Internet.

The use of credit cards for purchases by consumers is well known throughout the industrialized world. Credit cards offer consumers numerous benefits including: (1) reducing or eliminating the necessity for carrying cash; (2) "floating" or postponing actual payment of purchases for 45 to 60 days until the credit card bill is received and due; (3) providing users with a monthly or annual record of all purchases; (4) allowing consumers to monitor spending; (5) use during times of emergency when adequate cash is not readily available; (6) a convenient forum for financing purchases; (7) simplified return of items; (8) enhanced opportunities for resolution of disputed purchases; and (9) as use as an identification card. Credit cards have become so accepted in current day transactions that many people carry multiple cards.

From the consumer's point of view, the use of multiple credit cards is desirable for at least the following reasons: (1) a single credit card is not accepted by every merchant; (2) varying interest rates on balances carried on credit cards from month to month; (3) differences in billing dates or deferred payment; (4) different credit limits; (5) different requirements for obtaining credit cards; (6) segregation of purchases (e.g., personal, business related, etc.); and (7) recognition from carrying preferred or elite types of credit cards, such as Platinum cards. Each of these credit cards typically has a different credit limit, billing date, billing cycle, payment due date, financing alternatives, personal identification numbers (PINs), and contact information to contact the issuer of the credit card. Additionally, each credit card issuer issues a credit card that is normally carried by the card holder and that is presented when merchandise is purchased. The credit card, or similar token, typically includes embossed account information that is additionally encoded onto a magnetic strip on the rear of the card. Typically, possession of the physical credit card is required when making purchases in person. As a result of consumers carrying multiple credit cards, wallet sizes have increased and credit card carriers are faced with additional problems if a wallet is lost or stolen. Men typically carry wallets in their rear pockets, and as the size of wallets increases, health problems may occur from individuals carrying enlarged wallets in the same pocket over an extended period.

Accordingly, a need exists for a system and method for reducing the number of credit cards that must be maintained in a user's possessions without limiting account accessibility.

SUMMARY OF THE INVENTION

The present invention is directed to a system for and method of facilitating financial transactions including a terminal device that is configured to interface with a token, present information relative to the token to a user, and receive an input designating a selected account from the user. Also included in the present invention is a database that stores multiple account information for accounts at multiple financial institutions pertaining to the token and a processor that is configured to access the database, send and receive information from the terminal device and the database and generate charges on the selected account.

BRIEF DESCRIPTION OF THE DRAWINGS

FIG. 1 depicts a user using the present invention to aggregate account information into a database;

FIG. 2 is a flow chart corresponding to FIG. 1 for aggregating account information;

DETAILED DESCRIPTION

Figure 3:
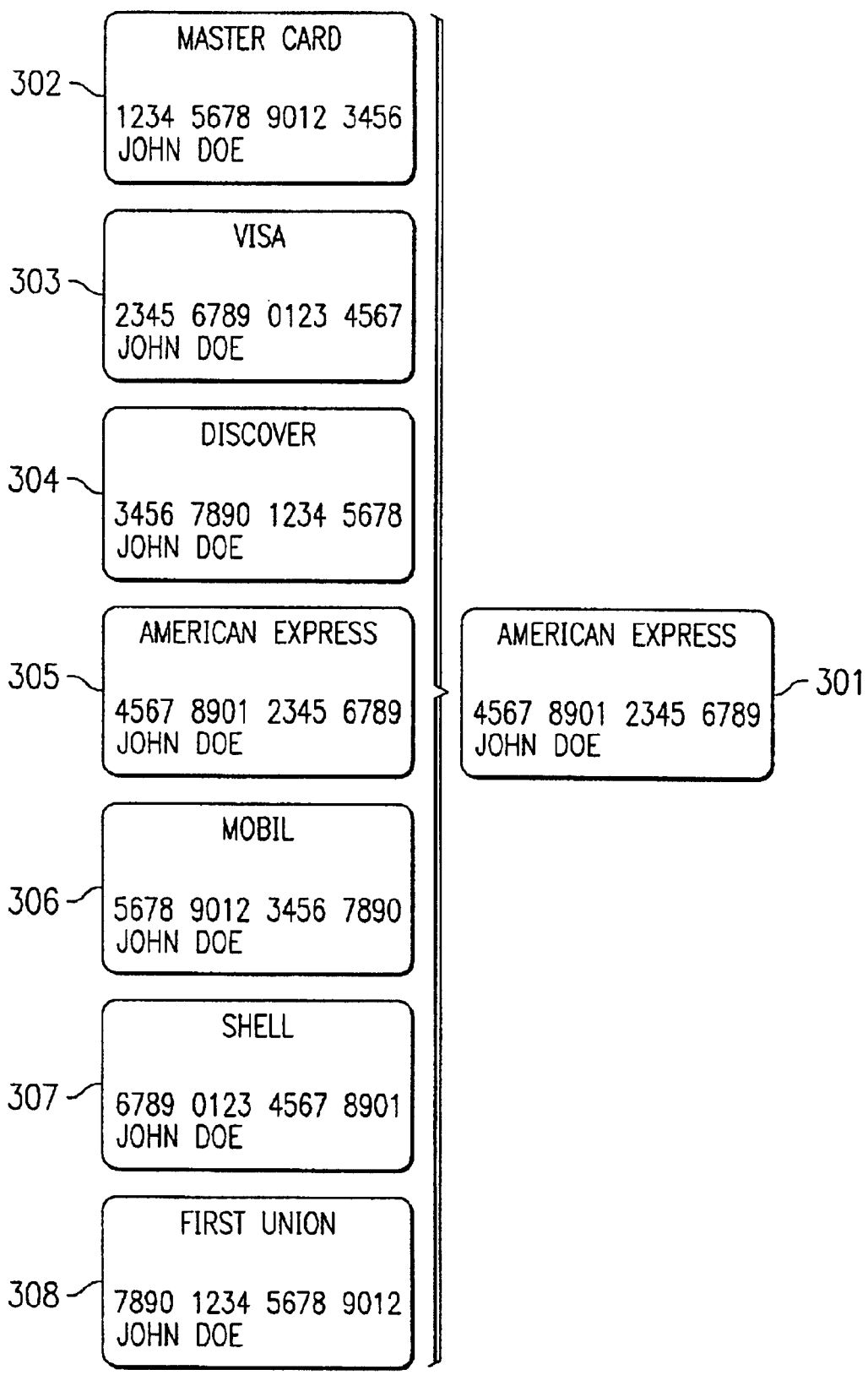
FIG. 3 is a block diagram representation of the card containing the aggregated account information.

The present invention includes a system for and a method of combining account information for multiple credit cards on a single credit card or other token. The consumer may access a database and register their multiple credit cards with a registration service that allows them to access the numerous credit card account information using a single credit card. For instance, if the consumer has several bank cards (e.g. MasterCard®, a Visa®, Discover®, American Express®, etc.) store cards (e.g. Sears®, Penney's®, etc.) and gas station credit cards (e.g., Shell®, Exxon®, Mobil®, etc.), the consumer may access the registration database and record all associated account information with the registration database and select a primary one of the credit cards to carry on their person. Once the alternate credit card information is recorded with the registration service, the card member may use the primary credit card or similar token for their purchases and when the primary credit card is used, account information for each of the registered credit cards may be displayed to the consumer. The consumer would then have the opportunity to select which of the credit cards the purchase should be charged to. In addition to conventional credit cards, automatic teller machine cards, debit cards or bank cards can be combined on the primary card to provide a single card for use by the consumer for their varied transactions. Similarly, information may be included on the primary card, which allows the primary card to be used for personal identification by the consumer.

FIG. 1 shows the registration process for multiple credit cards onto a primary credit card. User 101 may access database 105 through computer 102, an Internet 103, and server 104. Database 105 may store primary credit card information and associated accounts and this information may be accessed when a user presents the primary card for payment. Preferably information stored in database 105 is encrypted to limit unauthorized access. For example, various security features may be implemented in connection with certain accounts, transaction values, terminal being used, etc. Small transactions, such as purchases of gasoline from a self-service gas pump may not require additional user confirmation prior to providing access to the associated gasoline credit card. The user may also select a default account to be charged, (e.g., the Mobil® account is charged at Mobil® stations). Conversely, access to ATM card information may required the user to input a PIN prior to granting access. Use of a PIN further provides for decryption of associated account information using the PIN as a key. FIG. 1 further shows one format 106 of data storage in database 105.

FIG. 2 is a flow diagram that illustrates the process used by user 101 to register his various credit cards. Using computer 102, user 101 logs onto the registration database in step 201. One of ordinary skill in the art would understand that step 201 includes various methods for accessing the database, including direct access to the database, accessing database 105 through an Internet 103 and a server 104 connection, access via a telephone line, or any other method available to user 101 to set up an association between the various accounts and the primary credit card.

Once user 101 logs into the registration database, the system queries user 101 to submit identifying information in step 202. This identifying information may include name, address, telephone number, social security number, passwords, or other information required to identify the user. Identifying information may also include personal identification numbers assigned to currently held credit cards by the user. In this case, registration database 105 (FIG. 1) may interface, typically through Internet 103, to other databases, including the credit card issuer's database to verify the identity of the user. One of ordinary skill would understand that any manner of establishing the association between the user and their account information, including in-person transactions, are also included in the present invention.

Once the user has submitted identifying information in step 202, and their identity has been validated, the user selects a primary credit card that would be carried on the user's person in step 203. The user may select any of their existing credit cards, or may alternatively, select a new credit card. In step 203, the user submits account information, credit card issuer, Personal Identification Number (PIN), credit limit, or any other additional information desired to be stored in database 105. One of ordinary skill in the art would also understand that, with permission from the user, portions of this information can be obtained from the credit card issuer. This information may be used by the system to provide additional information to the user. For instance, a message may be generated and displayed to the user as a credit limit or billing date approaches.

Once the primary credit card has been identified in step 203, the user enters information pertaining to additional credit cards that they would like to be linked to the primary credit card in step 204. This information entered in step 204 may consist of account information, credit card issuer information, PINs, credit limits, billing rates, due dates, or any other information desired for database 105. In step 205 of FIG. 2, the user is presented the opportunity to update the PIN associated with the multi-use credit card. If the user desires to update their PIN, step 206 is used to allow the user to enter a new PIN and confirm the selected PIN. Once the new PIN is entered and confirmed or if the user decides not to update their PIN number, step 207 "End" is encountered. One of ordinary skill in the art would understand that the purpose of the processing depicted in FIG. 2 is to aggregate multiple account information pertaining to a user in a single database and associate that account information to a single or primary credit card.

FIG. 3 is a block diagram illustrating the end result of the registration process. In this example, the user has accessed database 105 (FIG. 1) and has selected an American Express® credit card 305 as the primary credit card in step 203 (FIG. 2). In step 204 of FIG. 2, the user has linked MasterCard® 302, Visa® 303, Discovers 304, Mobil® 306, Shell® 307 and their First Unions card 308 to the primary credit card 305. The user must present some token identifying the primary account, typically in the form of the physical credit card issued for that account. This multi-use card is identified as 301 in FIG. 3. While the primary credit card 301 may be used to charge purchases or services to any of the associated credit cards, the associated credit cards may still be used to post charges to that specific account.

Figure 4:
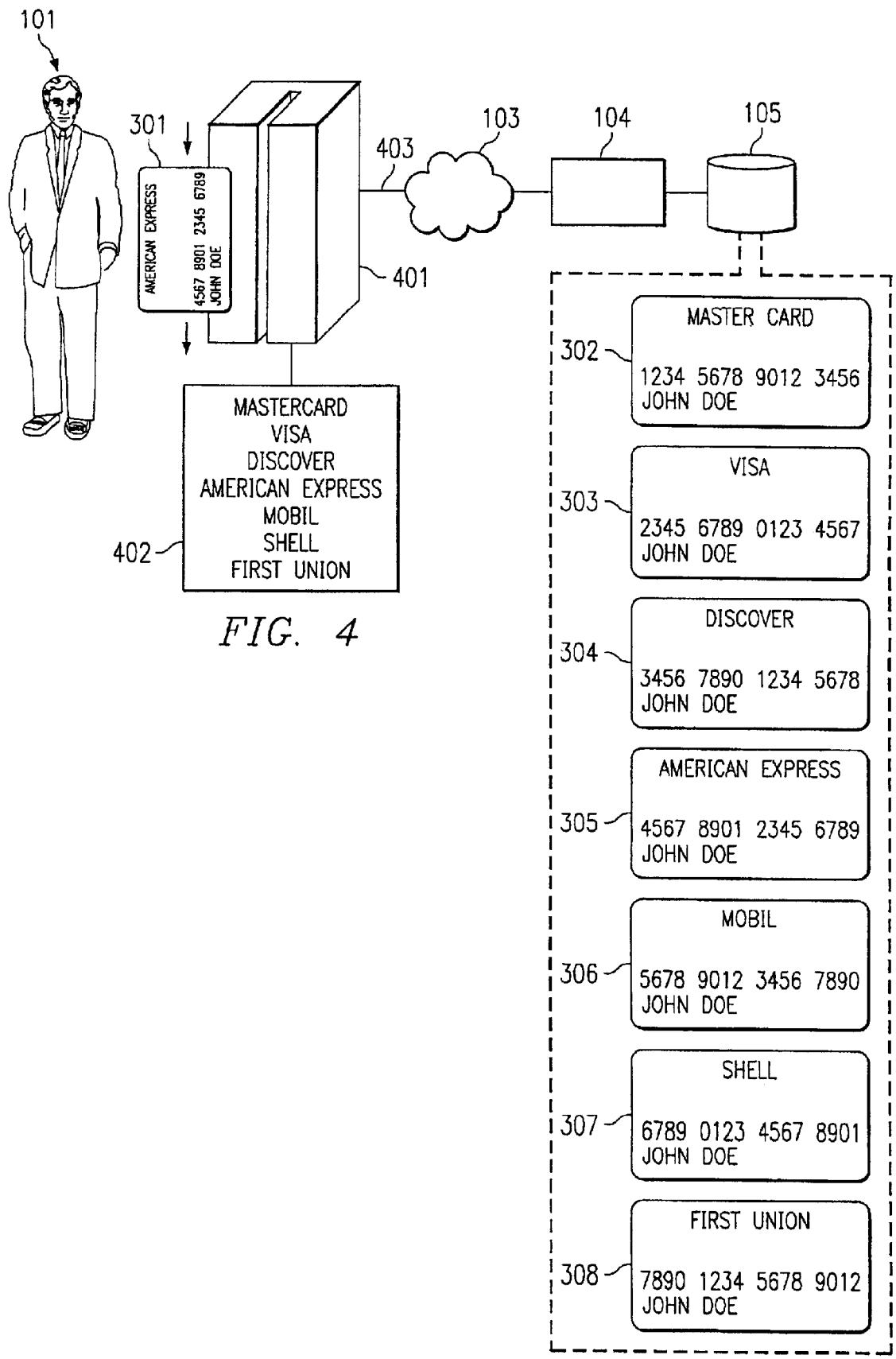
FIG. 4 is a block diagram depicting use of an aggregated card according to the invention.

FIG. 4 illustrates how a user may use a multi-use or primary credit card. The user, or a retailer, slides a multi-use credit card or other token through a terminal device such as card reader 401. Attached to card reader 401 is screen 402. The information read from card reader 401 is routed via communications link 403 to Internet 103, server 104 and database 105. Server 104 includes a processor. Within database 105, information read from multi-use credit card 301 is used to access the user's information obtained via the registration process illustrated by the flow chart of FIG. 2. Thus, by accessing database 105, software identifies that MasterCard® 302, Visa® 303, Discover® 304, American Express® 305, Mobil® 306, Shell® 307 and First Union® card 308 (FIG. 3) are each associated with multi-use credit card 301 for the user.

Information pertaining to cards 302 through 308 is then sent back to screen 402 for display. Display 402 is updated to include the various accounts associated with the multi-use credit card. The display of screen 402 is updated to show a selection for MasterCard®, Visa®, Discover®, American Express®, Mobil®, Shell®, and First Union®. The user may then select any of these options displayed on screen 402 to indicate which of the credit cards the current purchase should be charged to. This selection may be made via touch screen, mouse selection, light pen, voice, an enter key or any other method in which the user transmits their selection to the system. Once this selection is made, the appropriate charge would be posted to the selected credit card. Once the user selects the appropriate credit card for the charge, this information is passed back to database 105, which in turn, supplies the appropriate account information to the merchant. The merchant would then charge the purchase to the appropriate account in the normal manner as if the card for that account had been presented and swiped.

The invention provides a system and method for authorizing credit card transactions by the use of a single multi-use credit card. The system is comprised of three major components.

The first component is a card reading device. The card reading device functions as a scanning device to scan information from a credit card via the magnetic strip. In addition, the card reading device displays information to a user and receives input from selections made by credit card users.

The second component includes a database. The database stores information which associates various accounts with a primary card selected by user 101. The database typically resides on a server and is configured to communicate via an Internet. Through the Internet, a credit card user can update credit card account information.

The third component is a processor which is configured to receive information from the input device and the database and to generate charges on a user selected account.

The system interfaces with a primary credit card, which is typically formed of plastic and includes a magnetic strip, chip, or other device for storing encoded information. Preferably, secure data storage and transmission techniques and systems are used to avoid compromising sensitive account data and user information.

One of ordinary skill will also appreciate that additional information stored in database 105 may be displayed to the user on display 402 (FIG. 4). For instance, billing dates, approaching credit limits, extended warranty coverage offered by credit card companies, etc. may be displayed to the user to assist in the determination as to which account should be charged. In addition the server 104 of the invention may also query the merchant, or a database entry containing merchant information, to determine the types of credit cards which could be used for purchases from the merchant and adjust the displayed account information accordingly. For example, a gas card could not be used for a purchase at Sears® and should not be offered to the user as a possible selection.

What is claimed is:

1. A system for facilitating financial transactions comprising:

a terminal device configured to interface with a multi-use card, wherein said multi-use card was initially issued by an independent financial institution to represent a single independent credit account with said financial institution prior to use as a multi-use card, to present multi-use card information to a user, and to receive an input designating a selected account from said user;

a database storing account information for accounts at multiple financial institutions pertaining to said multi-use card; and a processor configured to access said database, to send information to said terminal device, to receive information from said terminal device and said database, and to generate charges on said selected account wherein said processor queries said database to determine the types of accounts that can be used for said financial transactions and limits the information sent to said terminal device to said accounts that can be used for said financial transactions.

2. The system of claim 1 wherein said terminal device includes a card reader configured to read said multi-use card and a display screen configured to display information associated with said multi-use card.

3. The system of claim 2 wherein said display screen is a touch screen.

4. The system of claim 1 wherein said multi-use card is a credit card.

5. The system of claim 1 wherein said database is stored remotely and wherein said system further comprises:

a remotely located platform hosting said database; and a communications system connecting said remotely located platform with said terminal device.

6. The system of claim 1 wherein said processor is configured to communicate via an Internet.

7. The system of claim 6 wherein said system is configured to permit a modification of said account information remotely.

8. The system of claim 1 wherein said generation of said charges is accomplished by providing selected account information to a retailer.

9. The system of claim 1 wherein said accounts are related to credit card issuers.

10. The system of claim 1 wherein said accounts are related to banking institutions.

11. A method for facilitating transactions comprising:

storing account information in a database, associating said account information with accounts at at least one financial institution, wherein said accounts are identified by electronic information on a multi-use card, wherein said multi-use card was initially issued by an independent financial institution to represent a single independent credit account with said financial institution prior to use as a multi-use card;

receiving said electronic information from said multi-use card;

accessing said account information on said database using said electronic information from said multi-use card;

presenting a plurality of account selection options representing said account information to a user wherein said plurality of account selection options is limited to accounts capable of facilitating said financial transaction;

accepting a selection designating a selected account from said plurality of account selection options; and generating charges on said selected account.

12. The method of claim 11 wherein said receiving step further includes:

reading data from a card reader.

13. The method of claim 12 wherein said presenting step further includes:

displaying said account information on a display screen.

14. The method of claim 11 wherein said multi-use card is a credit card.

15. The method of claim 11 wherein said accessing step further includes:

communicating via an internet.

16. The method of claim 15 further comprising:

modifying said account information remotely.

17. The method of claim 11 wherein said generating charges step further includes:

providing selected account information to the retailer.

18. The method of claim 11 wherein said accounts are related to credit card institutions.

19. The method of claim 11 wherein said accounts are related to banking institutions.

20. A method for providing access to multiple credit accounts via a single credit card, wherein said single credit card is to be used as a multi-use card, and was initially issued by an independent financial institution to represent a single independent credit account with said financial institution, wherein each account has an issued credit card, comprising:

identifying at least two independent credit accounts that are to be accessible via a single credit card;

storing information for each of said at least two independent credit accounts in a database;

designating a credit card for one of said at least two independent credit accounts as a multi-use credit card; and associating said stored information for each of said at least two independent accounts with said designated multi-use credit card, wherein a user may use said multi-use credit card to complete financial transactions involving any of a selected one of said at least two independent credit accounts.

* * * * *